United States Patent
Imashige

(10) Patent No.: US 7,810,597 B2
(45) Date of Patent: Oct. 12, 2010

(54) BATTERY PLACEMENT AND SUPPORT ON THE BODY FRAME OF A CONSTRUCTION MACHINE

(75) Inventor: Hirokazu Imashige, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 918 days.

(21) Appl. No.: 11/470,918

(22) Filed: Sep. 7, 2006

(65) Prior Publication Data

US 2007/0072063 A1 Mar. 29, 2007

(30) Foreign Application Priority Data

Sep. 29, 2005 (JP) ............................. 2005-285491

(51) Int. Cl.
B62D 25/12 (2006.01)
B62D 25/10 (2006.01)
(52) U.S. Cl. .................................. 180/69.2; 180/89.17
(58) Field of Classification Search ................ 180/68.5, 180/69.2, 89.17, 89.13, 8.7, 9.1
See application file for complete search history.

(56) References Cited

U.S. PATENT DOCUMENTS

| | | | | |
|---|---|---|---|---|
| 1,052,449 A | * | 2/1913 | Beck | 429/95 |
| 3,179,200 A | * | 4/1965 | Hoyt | 180/68.5 |
| 4,711,467 A | * | 12/1987 | Link et al. | 280/785 |
| 4,907,667 A | * | 3/1990 | Yamamoto et al. | 180/89.13 |
| 5,671,820 A | * | 9/1997 | Kobayashi et al. | 180/68.1 |
| 6,296,436 B1 | * | 10/2001 | Ramun | 414/719 |
| 6,481,748 B1 | * | 11/2002 | Okuda et al. | 280/755 |
| 6,669,272 B2 | * | 12/2003 | Ayabe et al. | 296/190.08 |
| 6,678,972 B2 | * | 1/2004 | Naruse et al. | 37/466 |
| 6,922,990 B2 | * | 8/2005 | Naruse et al. | 60/414 |
| 7,320,380 B2 | * | 1/2008 | Ueda et al. | 180/327 |
| 7,374,208 B2 | * | 5/2008 | Yamamoto et al. | 280/834 |
| 2003/0056404 A1 | * | 3/2003 | Iwasa et al. | 37/347 |
| 2004/0084924 A1 | | 5/2004 | Albright et al. | |
| 2005/0012314 A1 | * | 1/2005 | Kubo et al. | 280/757 |

FOREIGN PATENT DOCUMENTS

| | | | |
|---|---|---|---|
| EP | 806525 A2 | * | 11/1997 |
| EP | 1 306 490 A1 | | 5/2003 |
| EP | 1 647 635 A2 | | 4/2006 |
| EP | 1659225 A1 | * | 5/2006 |
| JP | 62-129464 | | 8/1987 |
| JP | 9-100551 | | 4/1997 |
| JP | 09100551 A | * | 4/1997 |
| JP | 11-001939 | * | 1/1999 |
| JP | 2000-273911 | | 10/2000 |
| JP | 2001-279715 | | 10/2001 |
| JP | 2003-328392 | | 11/2003 |

* cited by examiner

Primary Examiner—Lesley Morris
Assistant Examiner—Chiedu A Chibogu
(74) Attorney, Agent, or Firm—Oblon, Spivak, McClelland, Maier & Neustadt, L.L.P.

(57) ABSTRACT

A concave portion is provided on a front surface side of a counterweight provided in a rear end portion of an upper rotating body in a vertically penetrating state, a battery is housed in the concave portion in a state where a weight of the battery is supported by a body frame, thereby maintenance devices including the battery can be simultaneously given maintenance in a state where a hood is opened.

3 Claims, 4 Drawing Sheets

BATTERY PLACEMENT AND SUPPORT ON THE BODY FRAME OF A CONSTRUCTION MACHINE

BACKGROUND OF THE INVENTION

1. Field of the Invention

The present invention relates to a construction machine in which arrangement of a battery is improved such as a hydraulic excavator.

2. Description of the Related Art

In a hydraulic excavator in which an upper rotating body is rotatably mounted on a crawler type lower traveling body, a variety of devices such as an engine are mounted on a body frame of the upper rotating body, and the devices are covered by a guard cover.

Among the devices, devices which require daily maintenance such as the engine (hereinafter referred to as maintenance devices) are arranged in a rear portion and given the maintenance from a back surface side opening portion in a state where a hood is opened (refer to Japanese Patent Laid-Open No. 2001-279715).

However, in the conventional small-sized excavator, a battery which is one of the maintenance devices is arranged in extra space such as a foot portion of an operator seat apart from other maintenance devices due to a space limitation of a small-sized machine, and covered by a maintenance cover which is separately provided.

Therefore, since a maintenance point is divided into at least the rear portion and a battery portion and each portion requires an openable cover, cost became high. Also, since divided several points should be accessed, maintenance work became complicated.

SUMMARY OF THE INVENTION

It is an object of the present invention to provide a construction machine in which maintenance devices including a battery are concentrically arranged in a rear portion which is opened and closed by a hood so as to realize cost reduction and simplification of maintenance work.

The construction machine according to the present invention has the following basic configuration.

The construction machine according to the present invention is configured such that an upper rotating body is rotatably mounted on a lower traveling body around a vertical axis, devices such as an engine are provided in a rear portion of a body frame of the upper rotating body in a state where a maintenance opening can be opened and closed by a hood, and a counterweight is provided on a lower side of the hood in a rear end portion in a state where the hood is opened and an upper surface side is open. The construction machine of the present invention is also configured such that a concave portion is provided on a front surface side of the counterweight in a state where at least the upper surface side is open, and the battery is housed in the concave portion in a state where the battery is supported by the body frame.

According to the present invention, since the counterweight is provided with the concave portion in which at least the upper surface side is open and the battery is housed in the concave portion, it is possible to arrange the battery together with other maintenance devices in narrow rear space even in the small-size machine.

Consequently, since a maintenance cover exclusively used for the battery is not required, it is possible to realize the cost reduction and also to efficiently perform the maintenance work in once point by concentrating the maintenance devices in the rear portion.

Further, since the battery is supported by the body frame, the battery is oscillated integrally with the body frame upon machine oscillation. Therefore, unlike a configuration where the battery is supported by the counterweight, there is no fear that too much load is put on a connection portion of a harness to the battery or the like due to different oscillation states between the body frame and the counterweight. Also, since a decrease amount of weight due to provision of the concave portion can be supplemented by the battery, there is no fear that a counterweight function is decreased.

DESCRIPTION OF THE PREFERRED EMBODIMENTS

Figure 5:
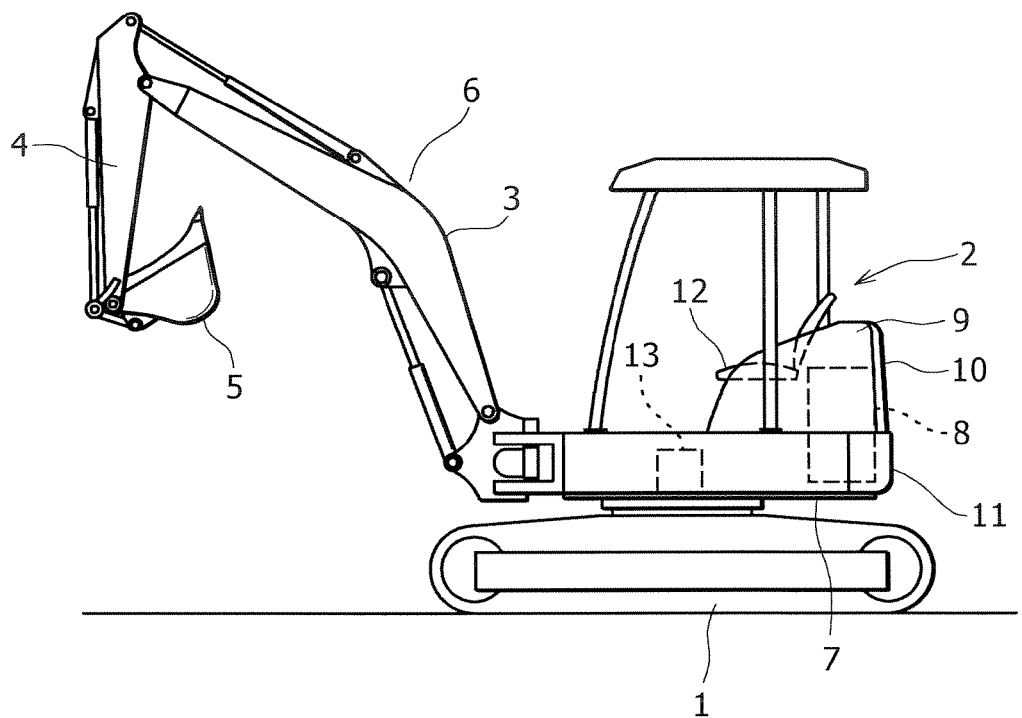
FIG. 5 is a schematic side view showing a small-sized hydraulic excavator.

A small-sized hydraulic excavator called a rear little-rotation type or the like which is of a preferred example of the present invention will be shown in FIG. 5.

The hydraulic excavator is configured such that an upper rotating body 2 is rotatably mounted on a crawler type lower traveling body 1 around a vertical axis and an excavating attachment 6 having a boom 3, an arm 4, a bucket 5 and the like is attached to a front portion of the upper rotating body 2.

The upper rotating body 2 has a body frame (commonly known as upper frame) 7 and a variety of devices such as an engine 8 are mounted on the body frame 7.

The devices are covered by a guard cover 9 and an opening portion for maintenance (not shown) which is opened and closed by a hood 10 is provided on a back surface side of the cover 9.

Among the devices, devices (maintenance devices) which require daily maintenance starting with the engine 8 are arranged in a rear portion and given maintenance from a back surface side opening portion in a state where the hood 10 is opened.

In FIG. 5, reference numeral 11 denotes a counterweight which is provided on a lower side of the hood 10 in a rear end portion of the upper rotating body 2 and reference numeral 12 denotes an operator seat.

An embodiment of the present invention will be described with reference to FIGS. 1 to 4.

Here, a small-sized hydraulic excavator is exemplified as an application subject.

It should be noted that since a basic configuration of the excavator in the embodiment is the same as the conventional excavator shown in FIG. 5, the same reference numerals are applied to the same portions and repeated explanation will be omitted.

The maintenance devices are mounted in the rear portion of the body frame 7 in the upper rotating body 2 in a state where the devices are covered by the guard cover 9 (shown in FIG. 3) and a maintenance opening 14 on a back surface side is configured so as to be opened and closed by a hood 15.

Figure 1:
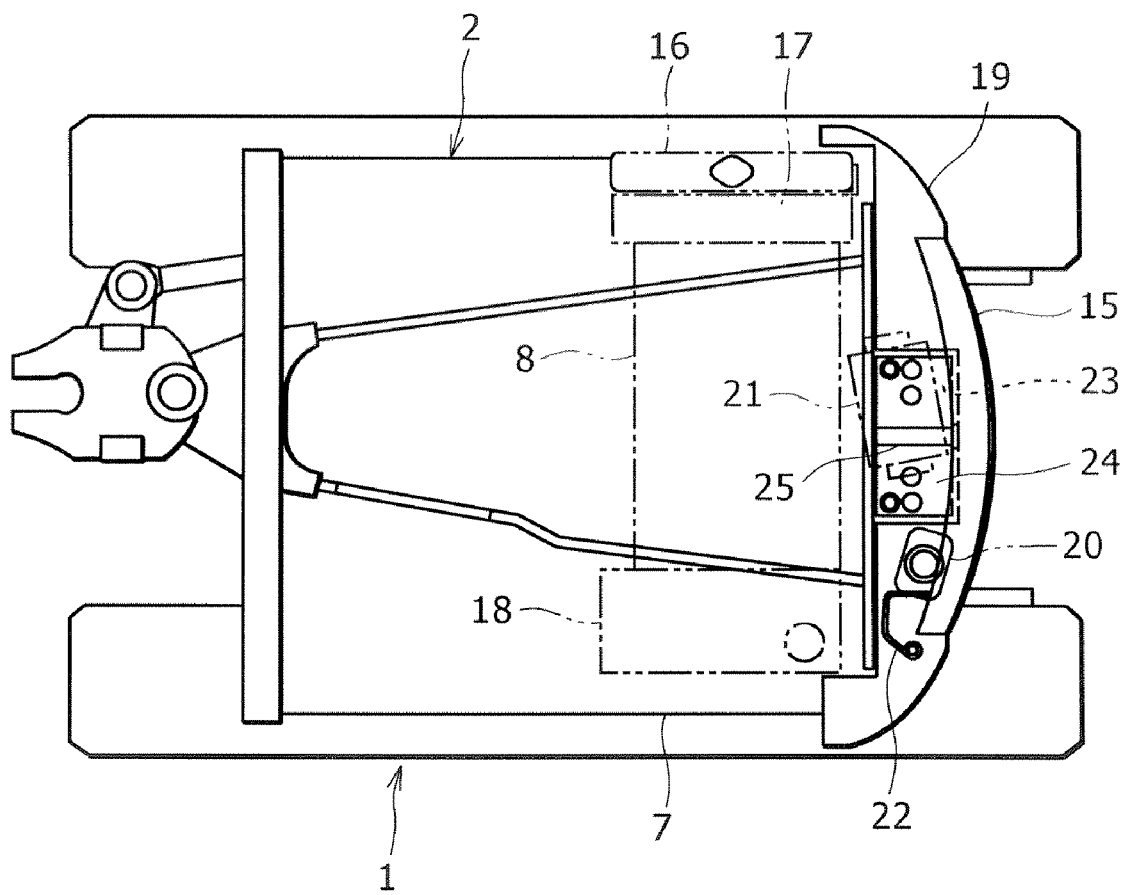
FIG. 1 is a schematic plan view of a hydraulic excavator according to an embodiment of the present invention.
Figure 2:
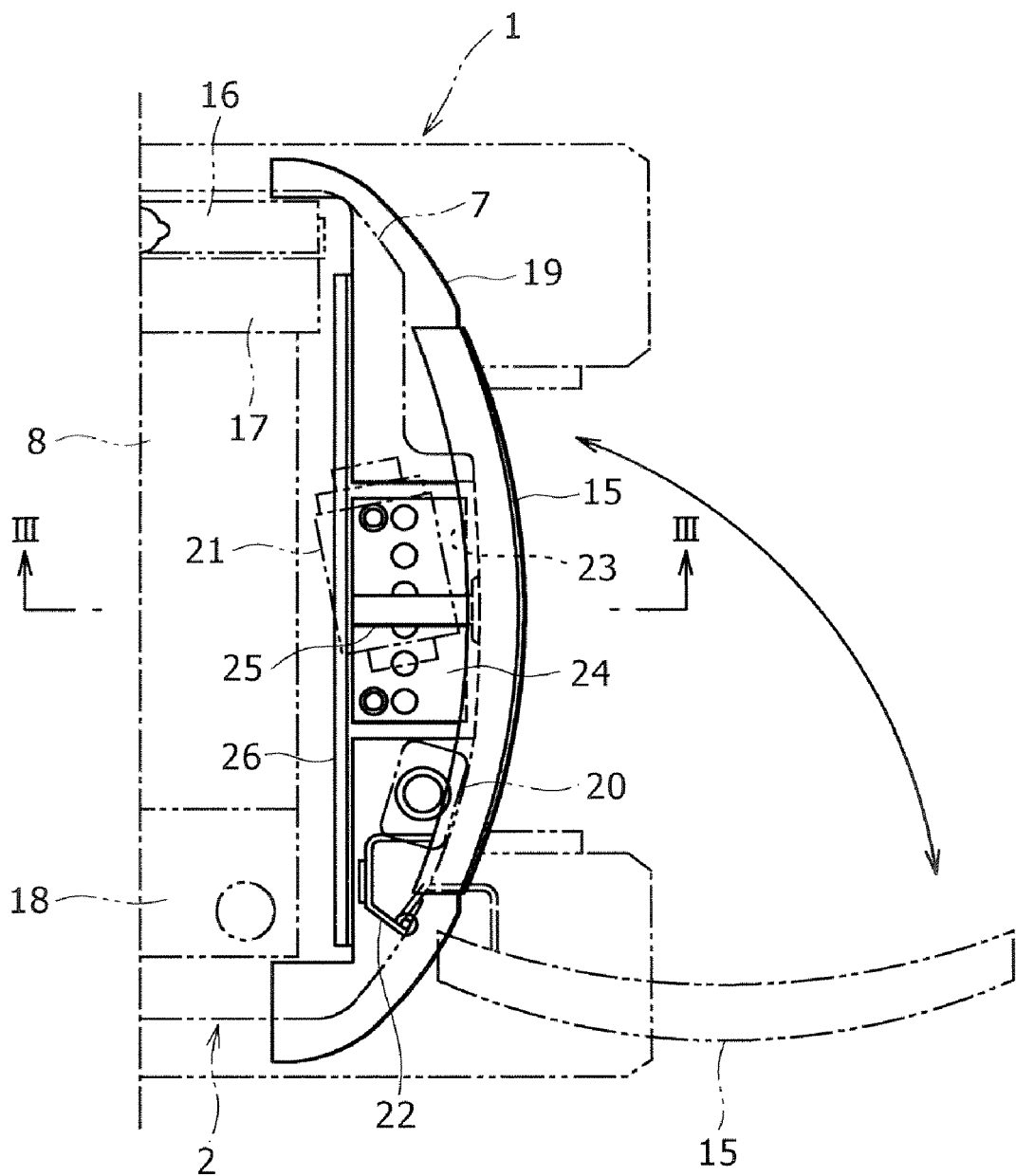
FIG. 2 is a view showing an enlarged portion of FIG. 1.

As the maintenance devices, as shown in FIGS. 1 and 2, the engine 8 is arranged on the center of the rear portion, a radiator 16 and a fuel tank 17 are arranged on the right and a working oil tank 18 is arranged on the left respectively.

A counterweight 19 is installed on a lower side of the hood 15 in the rear end portion of the upper rotating body 2. A radiator sub-tank 20 which is the maintenance device is arranged on an upper left side of the counterweight 19 and an air cleaner 21 which is also the maintenance device is arranged on the center respectively.

It should be noted that the hood 15 is rotatably (openably) attached around the vertical axis by a hinge member 22 which is provided on a left end portion. Consequently, it is possible to perform maintenance work on the maintenance devices in a state where the hood 15 is opened as shown by a two dotted line in FIG. 2.

In a state where the hood 15 is opened, an upper surface side of the counterweight 19 is open to the exterior.

In the counterweight 19, an outer surface is formed as a curved surface which is substantially circular arc and an inner surface is formed as a plane surface respectively. A concave portion 23 is provided on the center in a lateral direction on an inner surface (front surface) side of the counterweight 19.

The concave portion 23 is provided in such a vertically penetrating state where upper and lower surface sides other than a front surface side are open and a battery 24 is housed in the concave portion 23.

Figure 3:
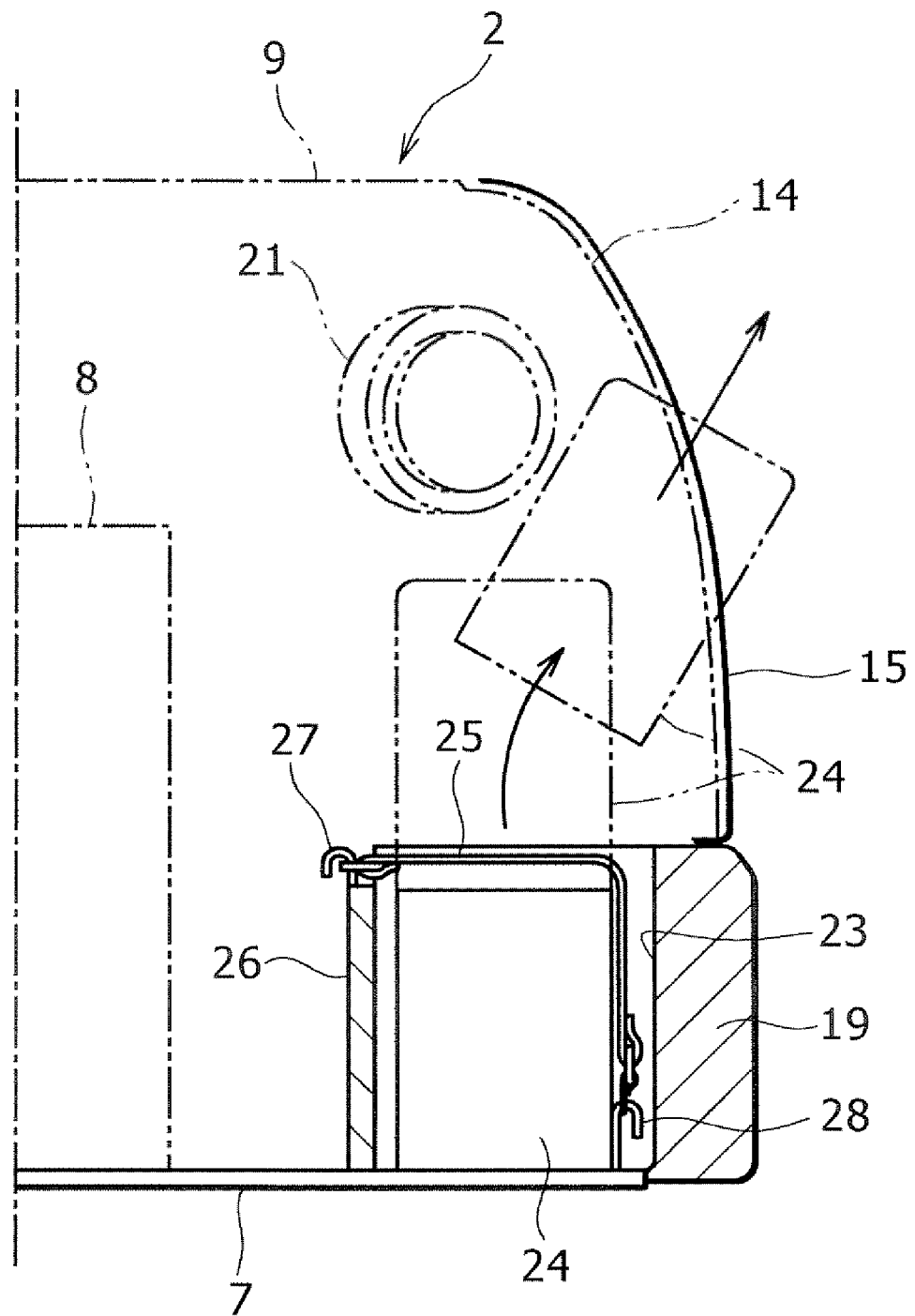
FIG. 3 is an enlarged sectional view along the line III-III of FIG. 2.

In this case, the battery 24 is mounted on an upper surface of a rear end portion of the body frame 7 in a state where the battery is fitted in the concave portion 23 as shown in FIG. 3.

It should be noted that in the concave portion 23, depth and width dimensions are set such that the whole battery 24 can be housed with some room.

The battery 24 is fixed to the body frame 7 by a band 25 which is exemplified as one of fixing means.

Figure 4:
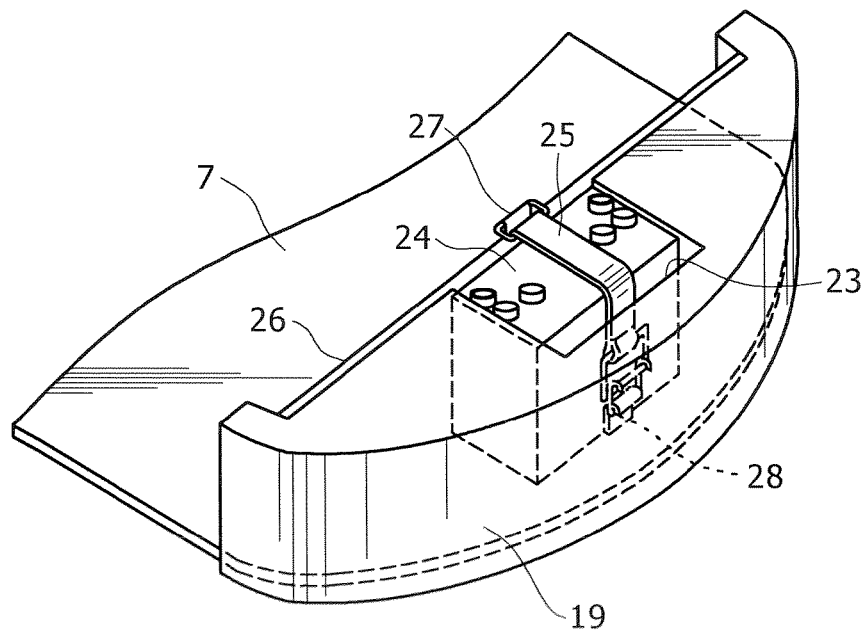
FIG. 4 is a perspective view of a portion shown in FIG. 2.

In the band 25, as shown in FIGS. 3 and 4, one end is put and fixed to a vertical plate 26 for reinforcement which is provided on a front side of the counterweight 19 in the rear portion of the body frame 7, and the other end is put and fixed to an upper surface of the rear end portion of the body frame 7 by hook-shaped clamps 27 and 28 respectively. Upon battery exchange, the band 25 can be removed from the hooks 27 and 28.

As a good method for facilitating the battery exchange, the following configuration can be considered.

(i) As shown in FIG. 3, the air cleaner 21 is arranged at a height position capable of forming sufficient space so that the battery 24 can be pulled out and drawn backward in a backward inclined attitude on an upper side of the battery 24.

(ii) As shown in FIGS. 1 and 2, the radiator sub-tank 20 is arranged at a position deviating leftward from upper side space of the battery 24.

As such, the concave portion 23 is provided on the center of a front surface side of the counterweight 19, the battery 24 is housed in the concave portion 23. Consequently, in the small-sized excavator described in the present embodiment, it is possible to arrange the battery 24 together with other maintenance devices in narrow rear space.

Consequently, since a maintenance cover exclusively used for the battery 24 is not required, it is possible to realize cost reduction Also, it is possible to simultaneously perform maintenance work from a back surface side by concentrating the maintenance devices including the battery 24 in the rear portion and only opening the hood 15. Therefore, it is possible to efficiently perform the maintenance work for a short time and to eliminate a conventional adverse effect that the maintenance work is neglected due to burden to access several points.

Since the battery 24 is supported by the body frame 7, the battery 24 is oscillated integrally with the body frame 7 upon machine oscillation. Therefore, for example unlike a configuration where the concave portion 23 is provided with a bottom and a battery weight is supported by the counterweight 19, there is no fear that too much load is put on a connection portion of a harness to the battery 24 or the like due to different oscillation ways between the body frame 7 and the counterweight 19.

On the other hand, due to provision of the concave portion 23, a weight of the counterweight 19 is decreased. However, since the battery 24 is sufficiently heavy as commonly known, a decrease amount of the weight can be supplemented by the battery 24. That is, there is no fear that a counterweight function is decreased as an adverse effect of the provision of the concave portion 23.

Further, since the concave portion 23 is provided in a vertically penetrating state, after the battery 24 is installed in the rear portion of the body frame, it is possible to install the counterweight 19 from an upper side or a rear side so that the battery 24 is fitted in the concave portion 23.

Therefore, for example, in comparison to a configuration where the battery 24 is housed in the concave portion 23 in which a lower surface side of the counterweight 19 is closed, or a configuration where the concave portion 23 is provided with a bottom so as to house the battery 24, it is possible to attach and detach the battery 24 and the counterweight 19 independently from each other. Therefore, an assembly performance is good and the exchange of the battery 24 is facilitated.

Further, as described above, a good method for arranging other devices (the air cleaner 21, the radiator sub-tank 20) is considered so as to ensure sufficient space for pulling out the battery 24 from the concave portion 23 and drawing backward on an upper side of the counterweight 19. Consequently, it is possible to easily and quickly perform the exchange of the battery 24 without disturbance of other devices.

As another embodiment, there may be a configuration where a battery receiving base is provided in a battery installation portion of the body frame 7 and the battery 24 is mounted on the battery receiving base.

Since almost all models of hydraulic excavators have limitation on installation space of devices, the present invention can be applied to not only the small-sized excavator but also all models of excavators and crushers, demolition machines and the like which are configured by diverting the excavators not limiting to the excavators.

Although the invention has been described with reference to the preferred embodiments in the attached figures, it is noted that equivalents may be employed and substitutions made herein without departing from the scope of the invention as recited in the claims.

I claim:

1. A construction machine, comprising:
   a lower traveling body;
   an upper rotating body rotatably mounted on said lower traveling body, the upper rotating body having a body frame;
   devices including an engine installed at a rear portion of said body frame;
   an openable hood provided at a rear side of said upper rotating body for covering a maintenance opening for performing maintenance work on said devices, wherein when the hood is opened, the maintenance opening is uncovered;

a counterweight arranged on said rotating body below said hood, said counterweight being provided such that an upper surface side of said counterweight is covered by said hood when said hood is closed and is open when the hood is opened, wherein the counterweight is provided with a surface located rearward of the engine, further comprising a concave portion which is rearward of said surface and extending downward into the counterweight from the upper surface side of the counterweight; and a battery housed in the concave portion and located rearward of the engine, said battery being directly supported by said body frame such that the battery is not supported by the body frame via the counterweight.

2. The construction machine according to claim 1, wherein said devices are arranged at the rear portion of said body frame such that sufficient space is provided for pulling out said battery from said concave portion and drawing said battery backward at an upper side of said counterweight.

3. The construction machine according to claim 1, wherein said battery is housed entirely in the concave portion.

* * * * *